United States Patent
Lo

(10) Patent No.: US 8,848,040 B2
(45) Date of Patent: Sep. 30, 2014

(54) 3D DISPLAY SYSTEM WITH ACTIVE SHUTTER PLATE

(75) Inventor: Kwok Wah Allen Lo, Hong Kong (HK)

(73) Assignee: 3DV Co., Ltd., Chai Wan (HK)

( * ) Notice: Subject to any disclaimer, the term of this patent is extended or adjusted under 35 U.S.C. 154(b) by 971 days.

(21) Appl. No.: 12/924,995

(22) Filed: Oct. 8, 2010

(65) Prior Publication Data

US 2012/0086776 A1    Apr. 12, 2012

(51) Int. Cl.
*H04N 13/02* (2006.01)
*H04N 15/00* (2006.01)
*H04N 13/04* (2006.01)
*G02B 27/22* (2006.01)

(52) U.S. Cl.
CPC ........ *G02B 27/2264* (2013.01); *H04N 13/0415* (2013.01); *H04N 13/0409* (2013.01); *H04N 13/0404* (2013.01); *H04N 13/0406* (2013.01); *G02B 27/2214* (2013.01); *H04N 13/0411* (2013.01); *H04N 13/0418* (2013.01)
USPC .............................................. 348/46; 348/42

(58) Field of Classification Search
None
See application file for complete search history.

(56) References Cited

U.S. PATENT DOCUMENTS

| | | | | |
|---|---|---|---|---|
| 6,252,707 B1 * | 6/2001 | Kleinberger et al. | ......... | 359/465 |
| 6,710,920 B1 * | 3/2004 | Mashitani et al. | ............ | 359/463 |
| 6,970,290 B1 * | 11/2005 | Mashitani et al. | ............ | 359/462 |
| 7,301,587 B2 * | 11/2007 | Uehara et al. | ................... | 349/15 |
| 2008/0136901 A1 * | 6/2008 | Schwerdtner | ................... | 348/51 |

* cited by examiner

*Primary Examiner* — Mehrdad Dastouri
*Assistant Examiner* — Kristin Dobbs

(57) ABSTRACT

A 3D display system uses a lenticular screen or a parallax barrier, along with a shutter plate, as a light directing device to allow a viewer's right eye to see a right image and the left eye to see a left image on a display panel. The right and left images are alternately displayed. The shutter plate has a plurality of right shutter segments and a plurality of left shutter segments arranged in an interleaving manner. When the right image is displayed, the right shutter segments are open and the left shutter segments are closed. When the left image is displayed, the right shutter segments are closed and the left shutter segments are open. But when the 3D display panel is used as a 2D display panel, both the right and left shutter segments are all open so that both the viewer's eyes see the image simultaneously.

13 Claims, 13 Drawing Sheets

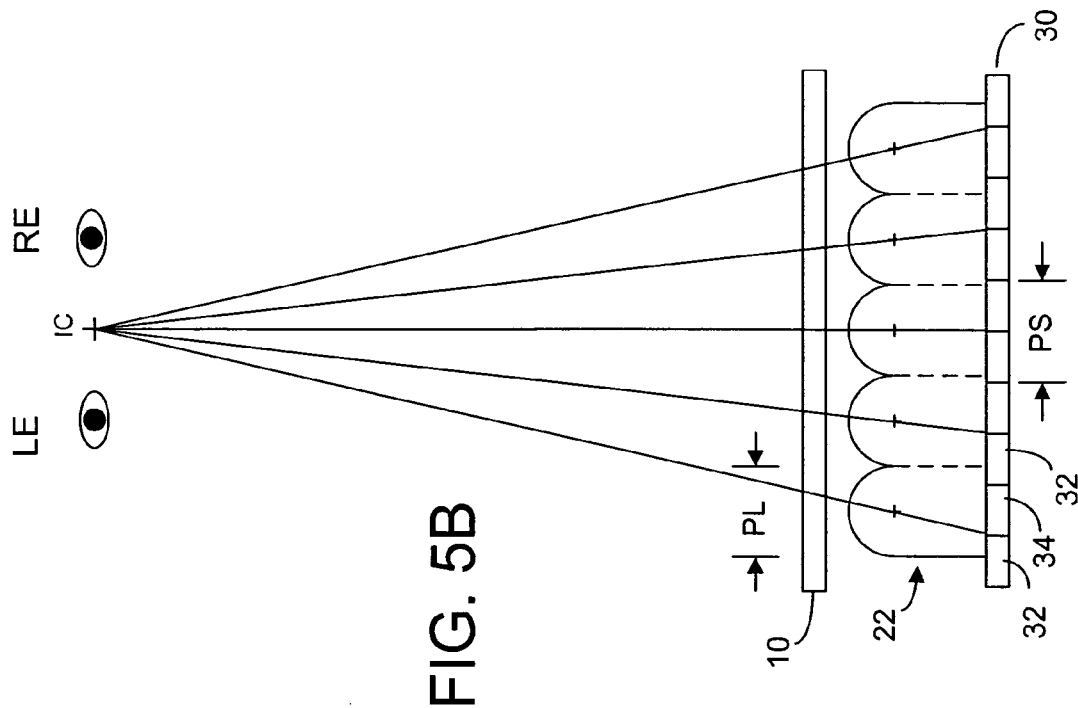
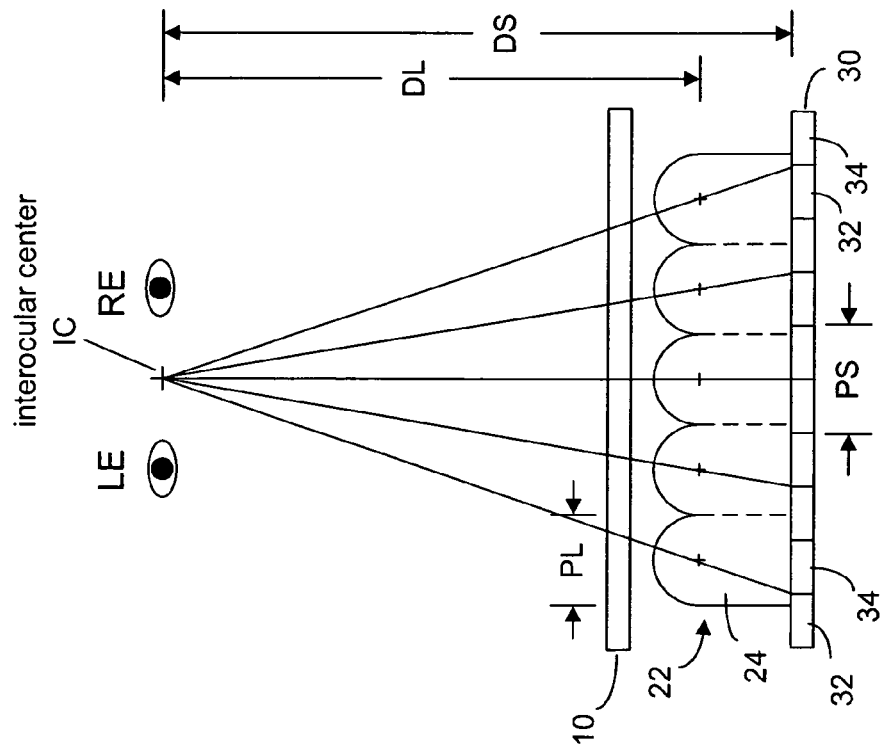

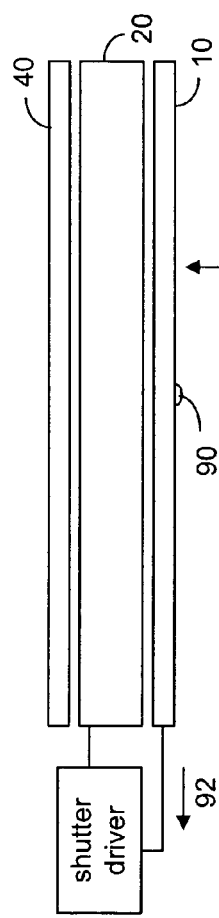
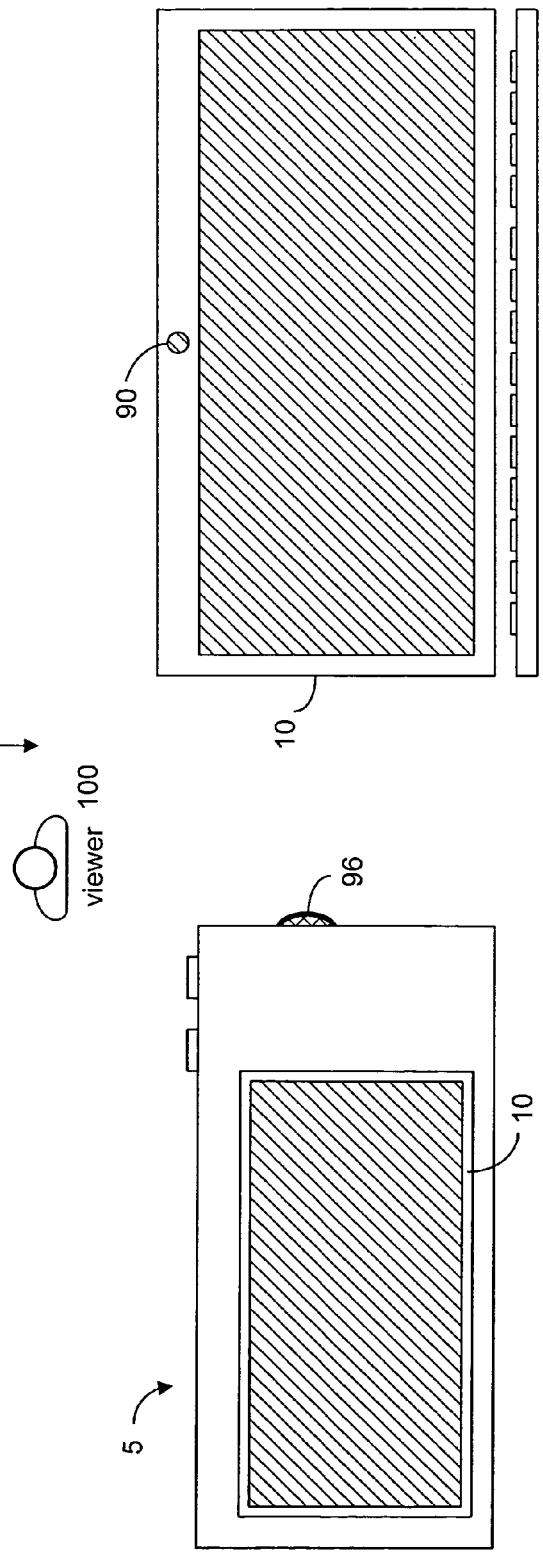
FIG. 6A
FIG. 6B
FIG. 6C

3D DISPLAY SYSTEM WITH ACTIVE SHUTTER PLATE

FIELD OF THE INVENTION

The present invention relates generally to a three-dimensional (3D) display system and, in particular, to a 3D display system having an active shutter plate for parallax separation.

BACKGROUND OF THE INVENTION

It is known that, in order to see a 3D image, each of a viewer's eyes must see a slightly different view of the same scene. In a 3D display system, different views of the same scene are displayed either in an alternate manner or in an interleaved manner on a display panel and a certain device is used to separate the view for the left eye from the view for the right eye. With a 3D display system that displays different views in an alternate manner, currently a viewer needs a special viewing binocular to see the different views. The viewing binocular has a left shutter and a right shutter alternatively open and closed for view separation.

It is advantageous to provide a different method and apparatus for viewing 3D images on a 3D display system that displays different views in an alternate manner, wherein the viewer does not require to use a viewing binocular to see 3D images.

SUMMARY OF THE INVENTION

The present invention uses a lenticular screen or a parallax barrier, along with a shutter plate, as a light directing device to allow a viewer's right eye to see a right image and the left eye to see a left image on a 3D display system. In the 3D display system, the right image and the left image are alternately displayed. The shutter plate has a plurality of right shutter segments and a plurality of left shutter segments arranged in an interleaving manner. When the right image is displayed, the right shutter segments are open and the left shutter segments are closed. When the left image is displayed, the right shutter segments are closed and the left shutter segments are open. But when the 3D display panel is used as a 2D display panel, both the right and left shutter segments are all open so that both the viewer's eyes see the image simultaneously.

Thus, the first aspect of the present invention is a 3D display system, which comprises a display panel for displaying a display image, the display panel having a first side and an opposing second side;

a light source for providing illumination to the display panel through the second side; and a light directing device comprising a light control panel located between the light source and the display panel, the light directing device configured to direct light from the light source passing through the light control panel toward the display panel at least in a first direction and a different second direction. The display panel can be a liquid crystal display panel, for example.

The shutter plate comprises a plurality of first shutter segments and a plurality of second shutter segments alternately arranged, each of the first shutter segments and the second shutter segments is operable in an open state to allow light to pass through and in a closed state to prevent light from passing through. The shutter plate can be a light valve, such as a liquid crystal plate.

The lenticular screen comprises a plurality of lenticules, each of the lenticules having a lenticule base, wherein the lenticular screen is positioned such that, at least in some of the lenticules, the lenticular base covers at least part of a first shutter segment and at least part of an adjacent second shutter segment. The first shutter segment and the adjacent second shutter segment define a shutter pitch and the base of the lenticules defines a lenticular pitch, wherein the shutter pitch is substantially equal to or greater than the lenticular pitch. In some embodiments of the present invention, the shutter pitch is adjustable based on the distance of the viewer from the display panel. In other embodiments of the present invention, the shutter segments can also be shifted laterally based on the location of the viewer.

The parallax barrier comprises a plurality of clear segments and a plurality of opaque segments alternately arranged, the parallax barrier is positioned such that light from the light source passing through the first shutter segments is channeled through the clear segments and the display panel in the first direction, and light from the light source passing through the second shutter segments is channeled through the clear segments and the display panel in the second direction. The parallax barrier can be a light valve for realizing the clear segments and the opaque segments.

The 3D display panel, according to various embodiments of the present invention can be used in a digital camera for displaying the acquired image or images. The 3D display panel can be used as a display screen in an electronic device, such as a computer, a game console, a DVD player and the like.

The second aspect of the present invention is a method for controlling viewing of an image displayed on a display panel, the display panel having a first side and an opposing second side. The method comprises:

disposing a light source spaced from the display panel for providing illumination to the display panel through the second side; and providing a light control panel between the light source and the display panel so as to direct light from the light source passing through the light control panel toward the display panel at least in a first direction and a different second direction.

The light control panel comprises a shutter plate, the shutter plate comprising a plurality of first shutter segments and a plurality of second shutter segments alternately arranged, each of the first shutter segments and the second shutter segments is operable in an open state to allow light to pass through and in a closed state to prevent light from passing through. The first shutter segments are operated in the open state and the second shutter segments in the closed state when the right-view image is displayed, and the second shutter segments are operated in the closed state and the second shutter segments in the open state when the left-view image is displayed.

The light control panel comprises a lenticular screen located between the display panel and the shutter plate, or a parallax barrier between the display panel and the shutter plate.

The present invention will become apparent upon reading the description taken in conjunction with the drawings in FIGS. 1 to 8d.

BRIEF DESCRIPTION OF THE DRAWINGS

FIGS. 5a and 5b show the relationship of the shutter pitch with the lenticular pitch based on the distance of the viewer.

FIGS. 6a and 6b show a device for obtaining the distance and location of a viewer.

FIG. 6c shows a device for allow a user to adjust the shutter segments.

DETAILED DESCRIPTION OF THE INVENTION

According to various embodiments, the 3D display system of the present invention comprises a display panel for displaying a display image, a light source for providing illumination to the display panel, and a lighting control panel located between the display panel and the light source for controlling the viewing of the display image.

Figure 1:
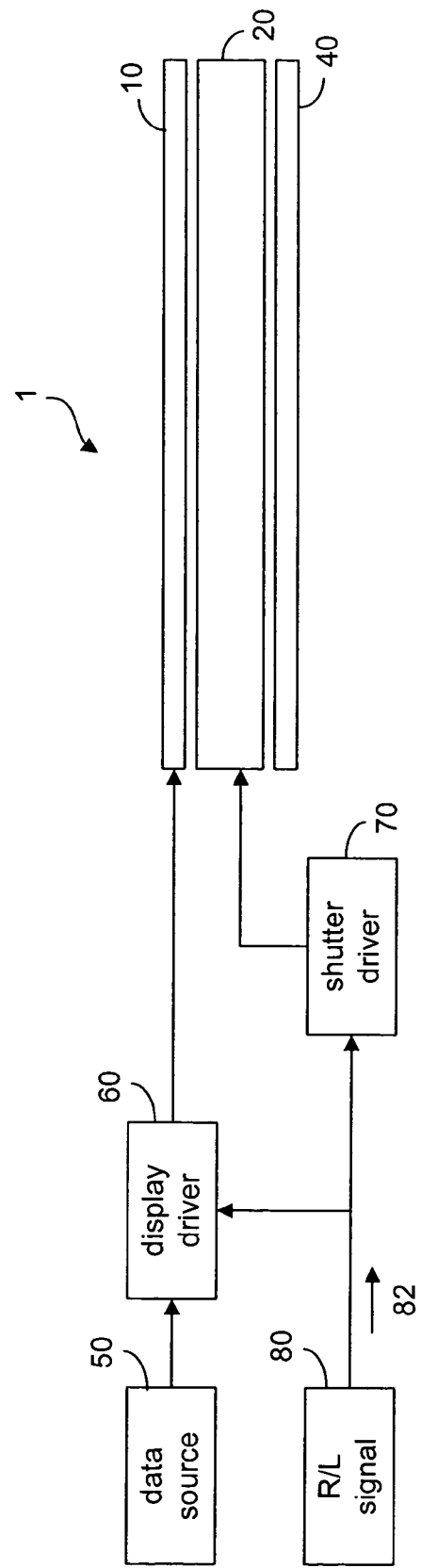
FIG. 1 is a 3D display system connected to various drivers and signal sources, according to one embodiment of the present invention
Figure 2:
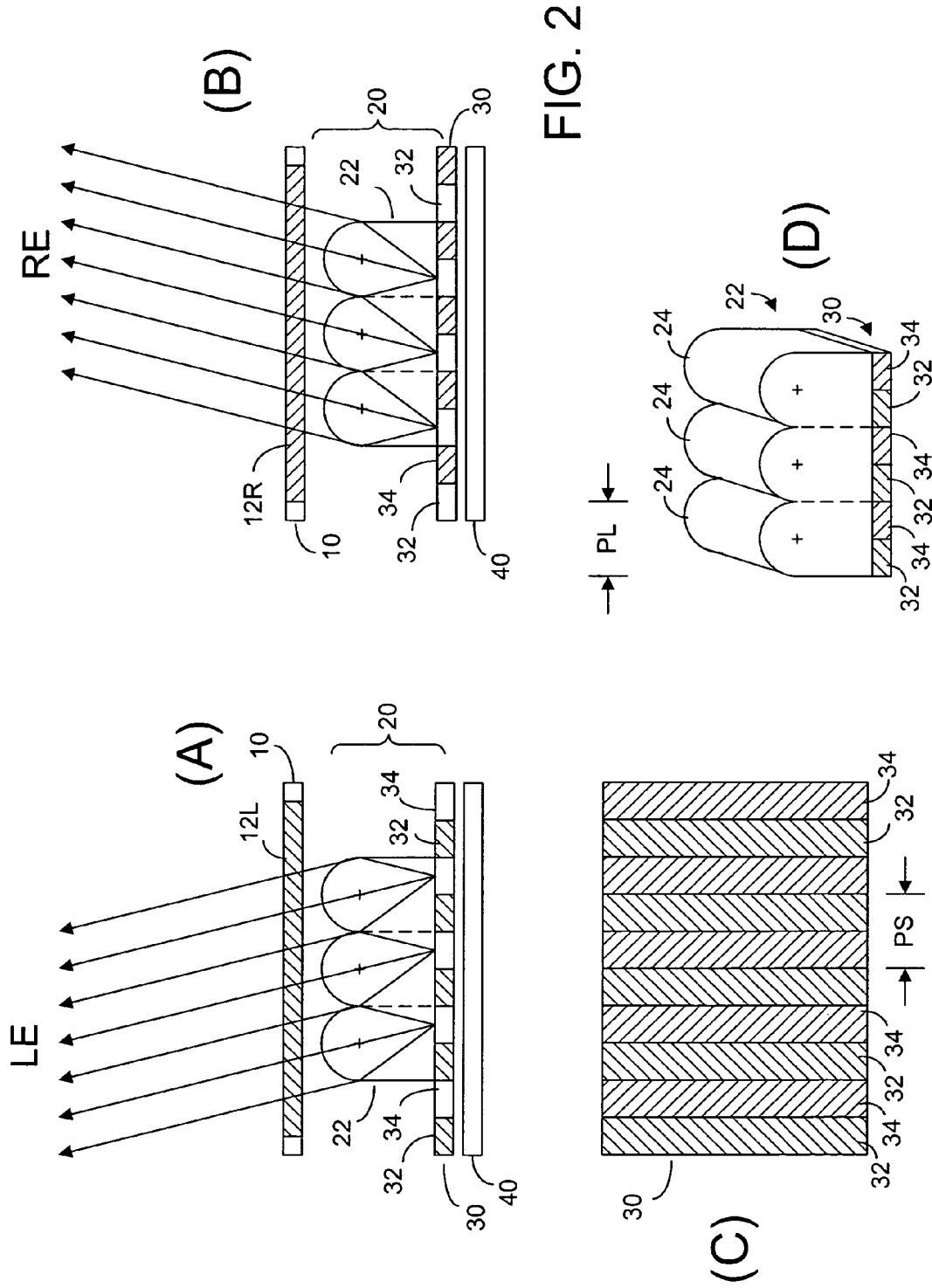
FIGS. 2a and 2b show how a shutter plate and a lenticular screen are used as a light directing device.
FIG. 2c shows a shutter plate having alternately arranged shutter segments.
FIG. 2d shows the relationship between the shutter plate and the lenticular screen.

As shown in FIG. 1, the 3D display system 1 comprises a display panel 10, a lighting control panel 20 and a light source 40. The display panel 10 is configured to receive display data from a data source 50 through a display driver 60. As shown in FIGS. 2a and 2b, the lighting control panel 20 comprises a shutter plate 30, and a parallax separation sheet, such as a lenticular screen 22. The shutter plate 30 is connected to a shutter driver 70. As shown in FIG. 1, the shutter driver 70 in the lighting control panel 20 and the display driver 60 are configured to receive a synchronization signal from an R/L signal source 80.

The display panel 10 can be a liquid-crystal display (LCD) panel. But it can be any other display panel that uses a light source 40 as a backlight source for illumination.

FIGS. 2a and 2b show how a lenticular screen 22 along with the shutter plate 30 can be used to allow the light from the light source 40 through the display panel 10 to reach one eye of a viewer while substantially blocking the light from the light source 40 from reaching the other eye. The shutter plate 30 comprises a plurality of first shutter segments 32 and a plurality of second shutter segments 34 arranged in an interleaved fashion, as shown in FIG. 2c. The first shutter segments 32 can be operated in an "open" stage or in a "closed" state independently of the second shutter segments 34, and vice-versa. In one of the embodiments of the present invention, the shutter plate 30 comprises an LCD plate and the shutter segments 32, 34 can be made clear to allow light to pass through in the open state. The segments 32, 34 can also be made opaque to block light from passing through in the closed state. Preferably, the width of the shutter segments 32 is equal to the width of the shutter segments 34. The pitch, PS, of the shutter plate is the sum of the width of a segment 32 and the width of a segment 34. The shutter plate 30 can also be made of any other light-valve material. In one embodiment of the present invention, the shutter plate 30 comprises a one-dimensional array of narrow strips for forming the shutter segments 32, 34 and each shutter segment is composed of a number of narrow strips (see FIG. 8c). As such, the width of each shutter segment can be adjusted by reducing or increasing the number of narrow strips in each shutter segment. Also, it is also possible to shift all the shutter segments to one direction or another. In another embodiment, the shutter plate 30 comprises a two-dimensional array of pixels (see FIG. 8d). As such, each of the shutter segments can be formed a number of pixel rows or columns. The width of each shutter segment can be adjusted and the shutter segments can be laterally shifted. Furthermore, the shutter segments can be electronically rotated.

Figure 5D:
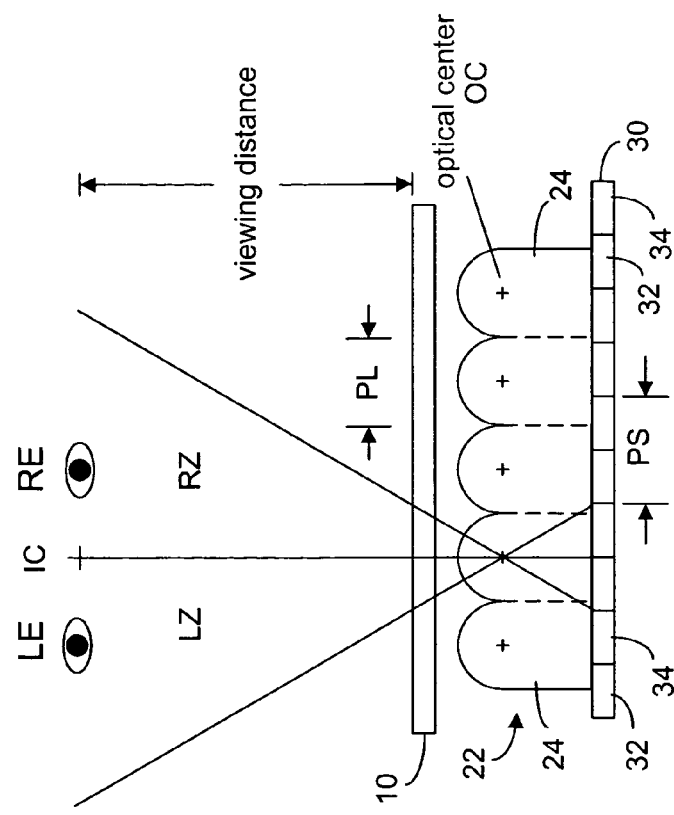
FIG. 5d shows the advantage of the shifting of the shutter segments.
Figure 5C:
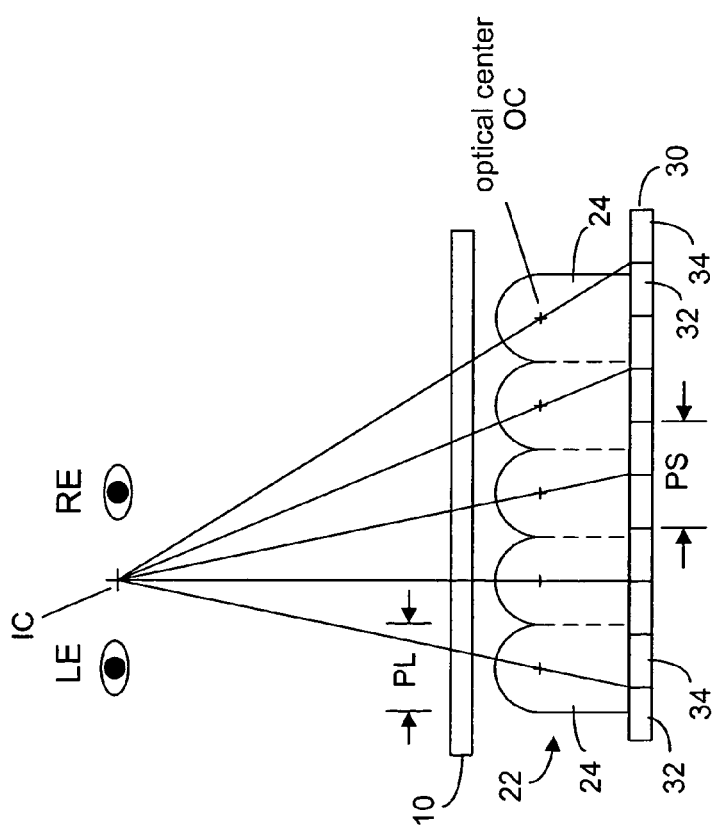
FIG. 5c shows the shifting of the shutter segments based on the location of the viewer.

It should be noted that a lenticular screen is a sheet of substantially transparent material, such as plastic or glass, having a plurality of cylindrical lenses 24 as shown in FIG. 2d. The pitch, PL, of the lenticular screen is the width of the cylindrical lenses 24. In a 3D display system, the pitch, PS, of the shutter plate 30 is substantially equal to or slightly greater than the pitch, PL, of the lenticular screen. In one embodiment of the present invention, the pitch PS is adjustable, as shown in FIGS. 5a to 5c.

Figure 3:
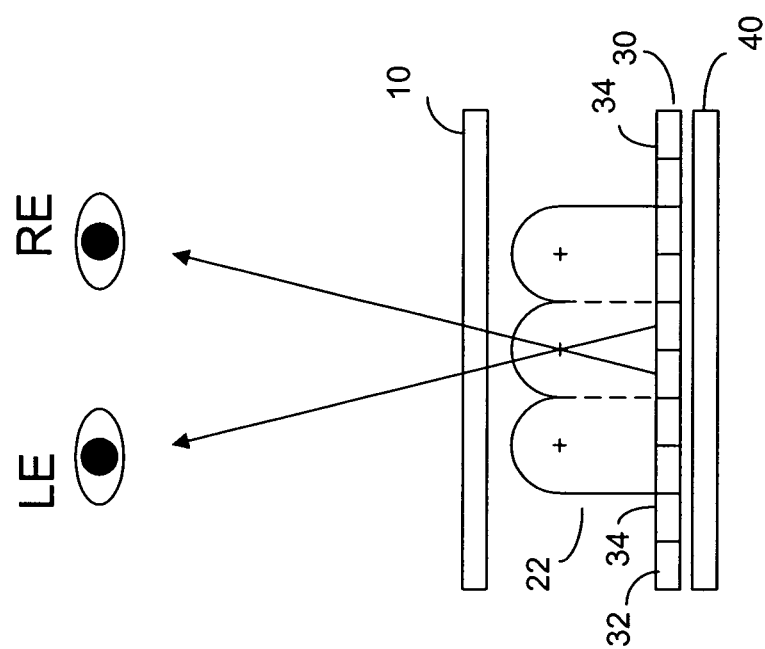
FIG. 3 shows how a lenticular screen and a shutter plate are used to direct light to a viewer's right eye and left eye.

As shown in FIG. 2a, while the display panel 10 displays an image 12L, the first shutter segments 32 are closed and the second shutter segments 34 are open. As such, light from the displayed image 12L can reach an eye in the LE direction. As shown in FIG. 2b, while the display panel displays an image 12R, the first shutter segments 32 are open and the second shutter segments 34 are closed. As such, light from the displayed image 12R can reach an eye in the RE direction. If a viewer's right-eye is placed along the RE direction and the left eye is placed along the LE direction, as shown in FIG. 3, the viewer can see either the displayed image 12R in the right eye or the displayed image 12L in the left eye, depending upon whether the first shutter segments 32 or the second shutter segments are operated in the open state. When the image 12R and the image 12L are alternately displayed at a certain frequency in synchronization with the open and closed states of the shutter segments 32, 34, the viewer perceives a 3D image formed by the image 12R and image 12L. In order to provide the synchronicity between the display images 12R, 12L and the shutter plate 30, the R/L signal source 80 is used to provide a signal 82 to both the display driver 60 and the shutter driver 70, as shown in FIG. 1.

The signal 82 can have different forms. In a simplest case, the signal 82 controls the operations in two display states. The signal 82 can be a square-wave signal having two voltage levels V1 and V2 to indicate the displaying of images 12R and 12L and the opening of shutter segments 32 and 34. In a different embodiment, the signal 82 comprises two different frequencies f1 and f2 to indicate the displaying of images 12R and 12L and the opening of shutter segments 32 and 34. In a different embodiment, the signal 82 controls the operations in three display states. In addition to the two display states as mentioned above, the signal 82 can have a third voltage level or third frequency to cause the shutter segments 32, 34 to open simultaneously so that the display system 1 can be used as a 2D display system.

Figure 4:
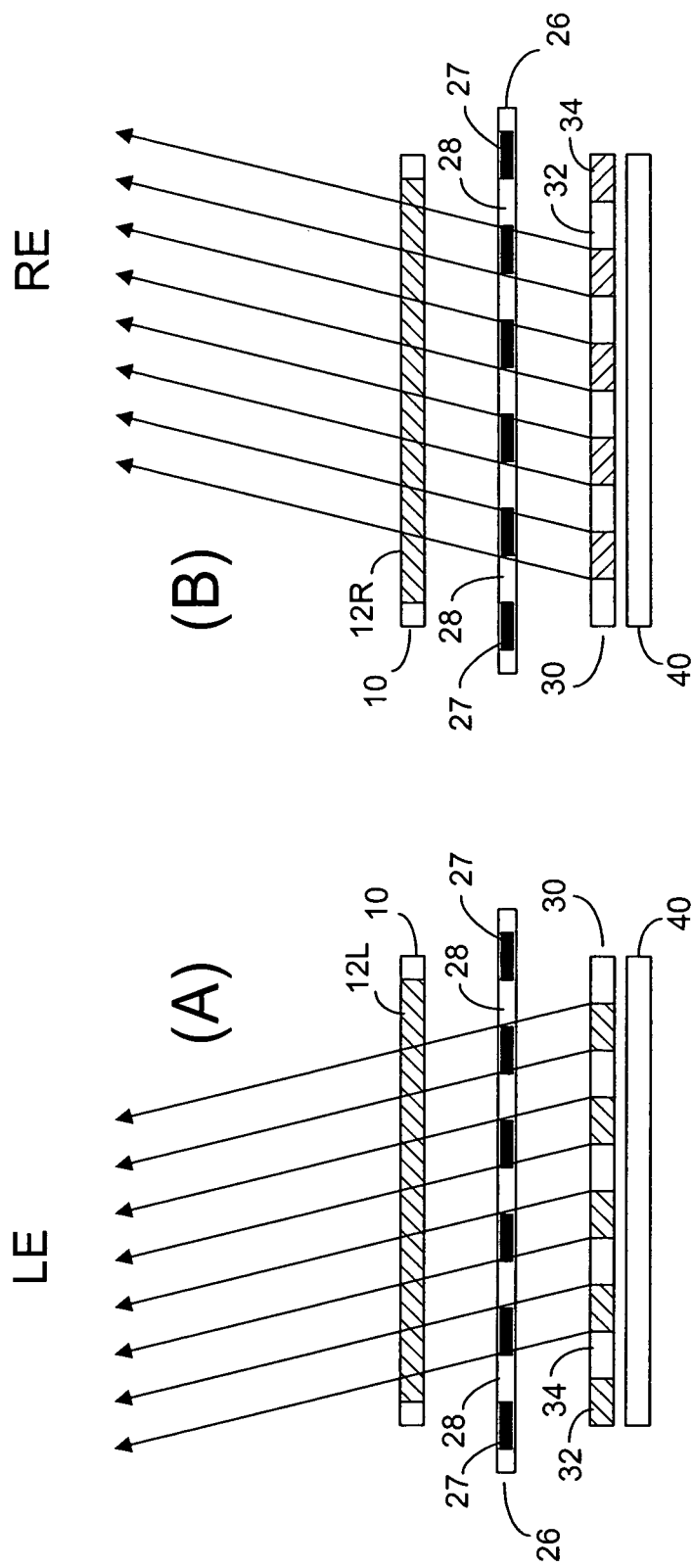
FIGS. 4a and 4b show how a shutter plate and a parallax barrier are used as a light directing device.
FIG. 4c shows that the shutter plate and a parallax barrier are both operated in a clear state so that the 3D display system is used as a 2D display system.
FIG. 4d shows the different arrangement of the parallax barrier and the shutter plate, according to one embodiment of the present invention.

In a different embodiment of the present invention, the lighting control panel 20 comprises a shutter plate 30 and a parallax barrier 26 as the parallax separation sheet, as shown in FIGS. 4a and 4b. The parallax barrier 26 comprises a plurality of opaque segments 27 and a plurality of clear segments 28 alternately arranged so that light can only be transmitted through the clear segments 28. As shown in FIG. 4a, when the shutter segments 32 in the shutter plate 30 are closed, light from the displayed image 12L can reach an eye in the LE direction. As shown in FIG. 4b, when the shutter segments 34 in the shutter plate 30 are closed, light from the displayed image 12R can reach an eye in the RE direction. The pitch of the parallax barrier is the sum of the width of a clear segment 28 and the width of an opaque segment 27.

Figure 4C:
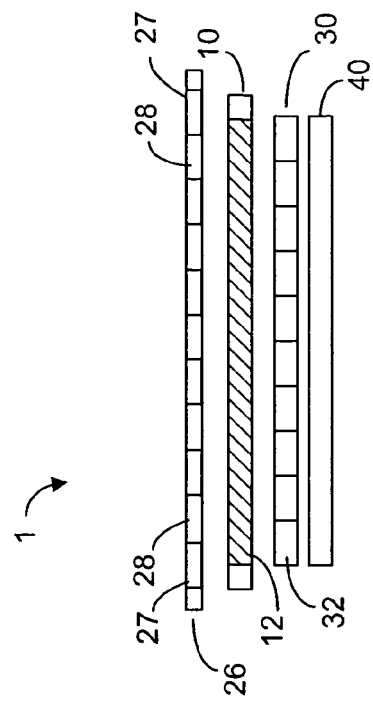
Figure 4D:
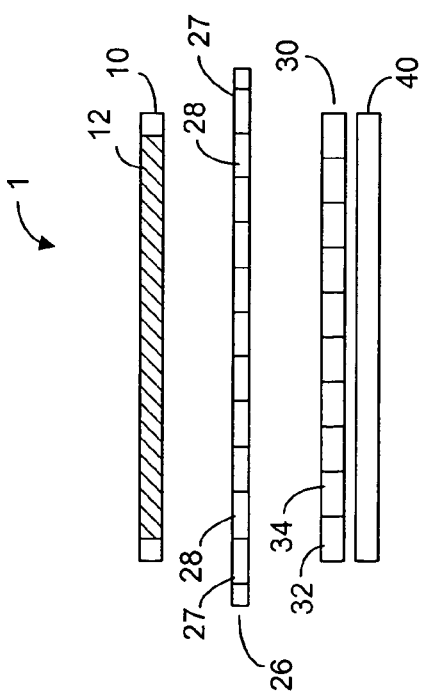

The parallax barrier 26 can be made of a sheet of opaque material having a plurality of cut-out strips to form the clear segments 28. It can be made of a sheet of transparent material having a plurality of printed strips to form the opaque segments 27. The parallax barrier 26 can also be made of a light-valve material, such as a liquid-crystal display panel, for forming the opaque segments 27 and the clear segments 28. If the parallax barrier 26 is made of a light-valve material, the segments 27 can also be turned into clear segments when the display system 1 is used as a 2D display system, as shown in FIG. 4c. It is possible to place the display panel 10 between the parallax barrier 26 and the shutter plate 30, as shown in FIG. 4d. Also, the positions of the parallax barrier and shutter plate can be interchanged. This means that the parallax barrier 26 can be placed adjacent to the light source 40 and the shutter plate 30 is located between the light source 40 and the parallax barrier 26.

Preferably, when the display system is used as a 3D display system, the pitch PS of the shutter plate 30 is adjusted according to the location of a viewer. As shown in FIGS. 5a to 5c, the pitch PS of the shutter plate 30 is slightly greater than the pitch PL of the lenticular screen 22 (or that of a parallax barrier 26). Preferably, the pitch PS of the shutter plate 30 is adjusted so that it is substantially equal to $(DS/DL) \times PL$, where DL is the distance from the interocular center IC to the optical center OC of the lenticular screen and DS is the distance from the interocular center IC to the shutter plate 30. This is equivalent to the situation in which the line drawn from the interocular center IC to the border of an adjacent pair of shutter segments 32, 34 under a lenticule 24 passes through the optical center OC of the lenticule, as shown in FIG. 5a. Here the interocular center is the center point between the eyes of a viewer. The optical center of the lenticule is substantially located at the center of the radius of curvature of the cylindrical surface of the lenticule.

Figure 8A:
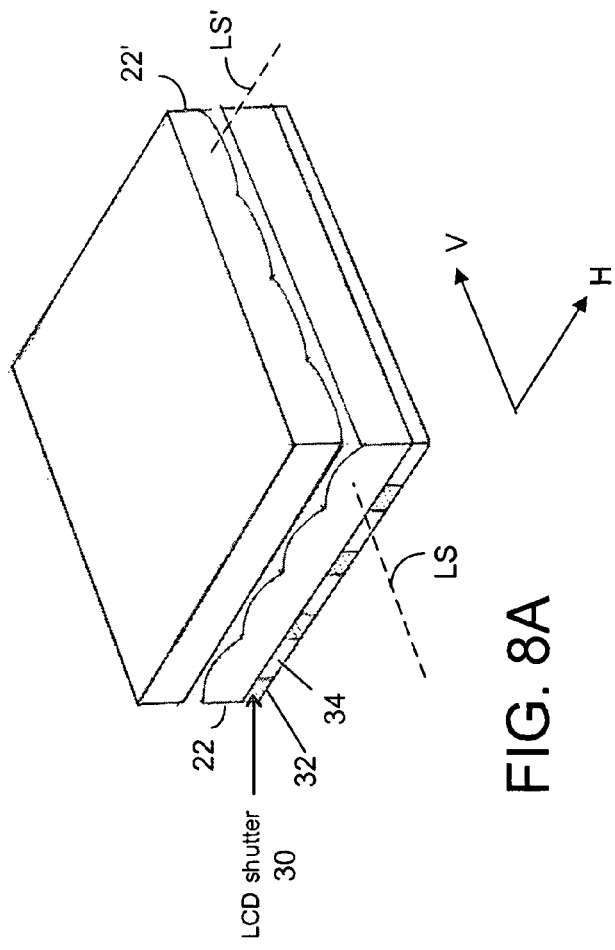
FIGS. 8a and 8b show different lenticular screens for use in the 3D display system, according to different embodiments of the present invention.
Figure 8B:
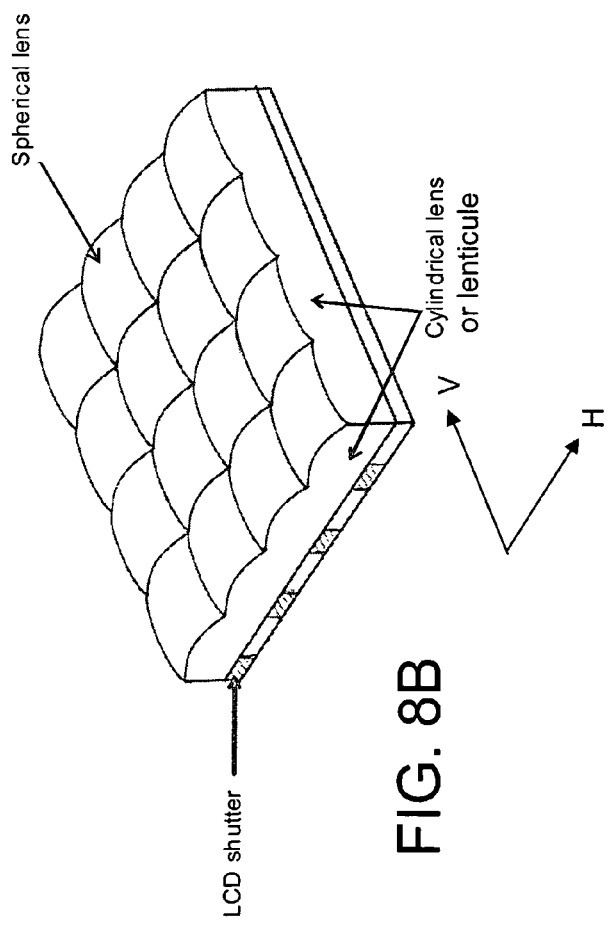
Figures 8C, 8D:
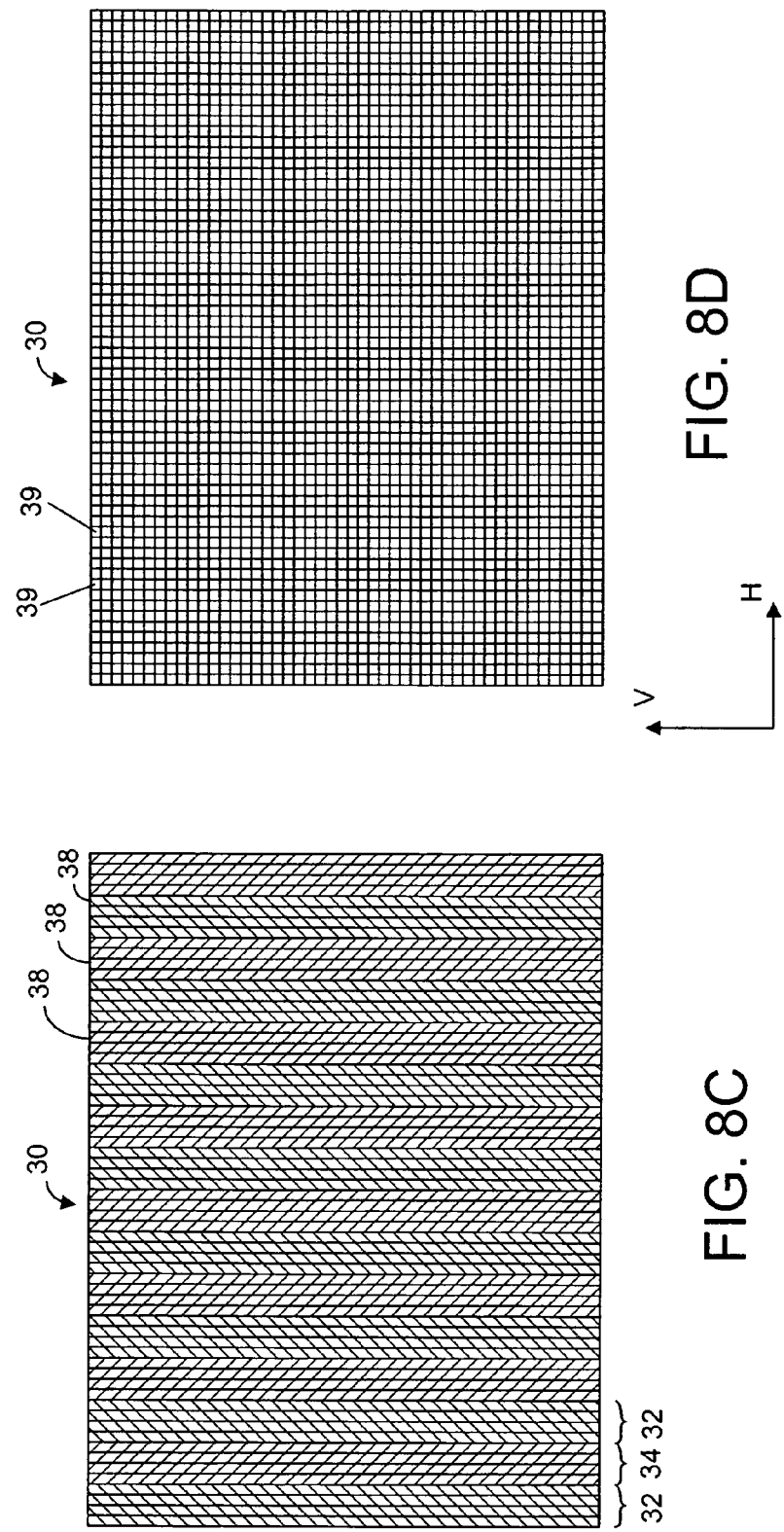
FIG. 8c shows a shutter plate comprising a one-dimensional array of narrow strips for forming the shutter segments.
FIG. 8d shows a shutter plate comprising a two-dimensional array of pixels for forming the shutter segments.

It should be noted that the ratio (DS/DL) changes with the distance from the viewer to the display system. As the viewer moves further away from the display system, the difference between PS and PL becomes smaller, as shown in FIG. 5b. In another embodiment of the present invention, the adjustment of shutter plate 30 includes a lateral shift of the shutter segments 32, 34 based on the lateral shift of the viewer, as shown in FIG. 5c. In FIG. 5c, the viewer (and thus the interocular center) is slightly shifted to the left. It should be noted that, in order for the viewer to see the 3D image correctly, the left eye LE must be located in the viewing zone LZ, and the right eye RE be located in the viewing zone RZ as shown in FIG. 5d. The lateral shift of the shutter segments 32, 34 would allow the viewer's left eye and right eye to be located in the correct viewing zones as the viewer moves laterally. Ideally, the shutter segments can be adjusted continuously in response to the movement of the viewer. However, in a shutter plate where each of the shutter segments is composed by a finite number of strips (see FIG. 8c), the shutter segments can only be adjusted in a step-wise fashion. It can be shown that, in most cases, it is sufficient to have the width of each strip being ⅛ of the lenticular pitch PL. For example, if the lenticular pitch PL is equal to 0.4 mm, the thickness of the lenticular screen is about 1 mm and the viewer is about 300 mm away from the display panel, the viewing zone LZ or RZ is approximately equal to 60 mm at the viewing distance. Assuming that the distance between the two eyes of a viewer is 60 mm, a step-wise adjustment of shutter segments of (0.4 mm)/8 will allow a viewer to view a 3D display correctly while the viewer moves his or her head laterally within 30 mm, left or right. FIG. 8c illustrates an LCD or light valve shutter plate 30 having a plurality of narrow strips 38 for realizing the shutter segments 32 and 34. Depending on the desirable width of the shutter segments, the number of narrow strips 38 in each shutter segment can be varied.

In one embodiment of the present invention, a distance sensing device 90 is provided on the display panel 10 to obtain the distance DV and the location of the viewer 100 in relation to the center of the display unit, as shown in FIGS. 6a and 6b. Since, the pitch PL of the lenticular screen, the distance between the optical center of the lenticular screen to the shutter plate, and the distance between the shutter plate to the display panel are known, the pitch PS of the shutter plate can be calculated based on the distance DV. FIG. 6b can be a television set, a computer, a gaming console, an audiovisual player or the like.

The distance sensing device 90 can be a camera having an autofocus mechanism to determining the distance of the viewer, for example. It can also be a sonar distance measurement device. The distance and location information 92 can be conveyed to the shutter driver 70 in order to adjust the pitch PS according to the distance DV and the location, for example. Alternatively, the viewer can adjust the pitch PS using a remote control, for example. When the display panel 10 is part of a hand-held device 5, such as a digital camera, a smart phone, a gaming console, an audiovisual player and the like, the adjustment of the shutter plate can be performed manually by a viewer using an adjustment knob 96 as shown in FIG. 6c, for example. When the display panel 10 is a monitor on a desktop computer, a laptop computer or a television set, it is possible for a viewer to adjust the shutter plate in the same manner.

Figure 7A:
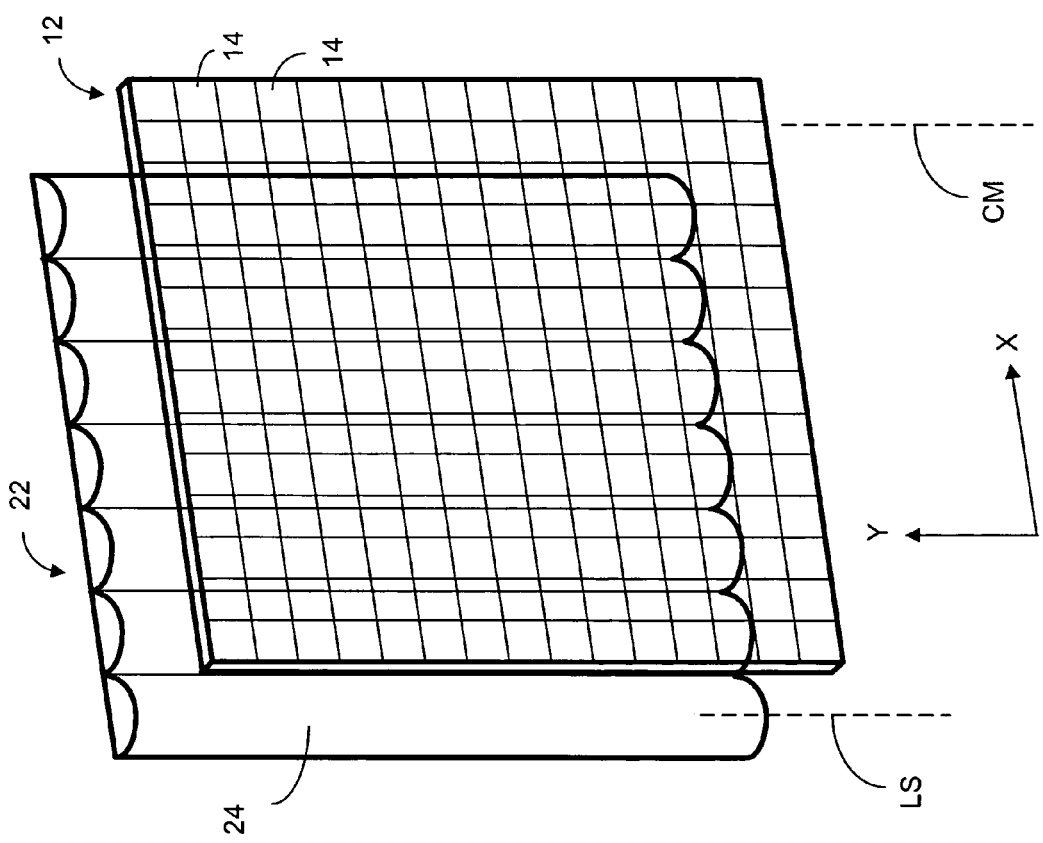
FIG. 7a shows the relationship between the lenticular axis and the display panel, according to one embodiment of the present invention.

It is known that an image 12 displayed on an LCD panel, or the like, comprises a plurality of pixels 14 arranged in a two dimensional arrays of rows and columns. In general, the rows are arranged in an axis parallel to the X axis and the columns are arranged in an axis CM parallel to the Y axis as shown in FIG. 7a. Furthermore, the lenticular screen 22 also has a lenticule axis LS. The lenticular axis LS is the longitudinal axis of the lenticules or cylindrical lenses 24. It is preferred that while the lenticules 24 are aligned with the shutter segments 32, 34 as shown in FIG. 2D, the lenticular axis LS and the column axis CM of the display panel are not parallel to each other, but are offset by a few degrees in order to minimize the occurrence of a Moire pattern.

Figure 7B:
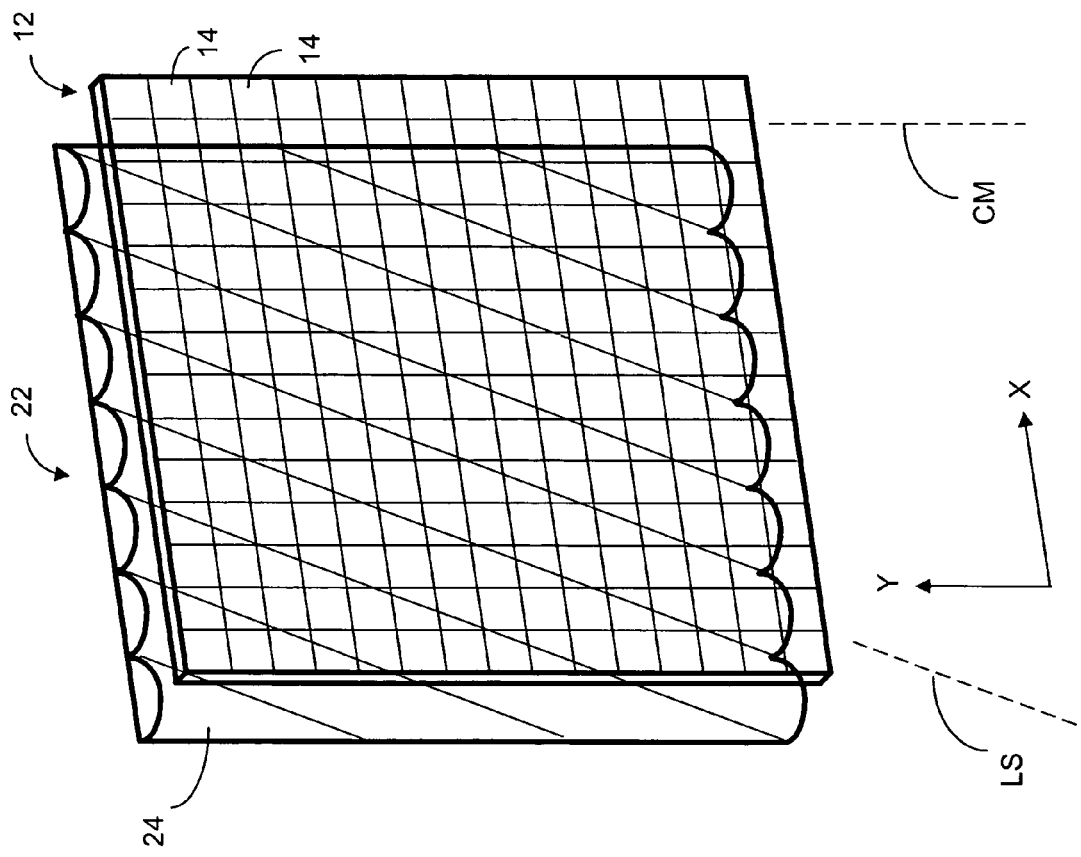
FIGS. 7b and 7c show the relationship between the lenticular axis and the display panel, according a different embodiment of the present invention.
Figure 7C:
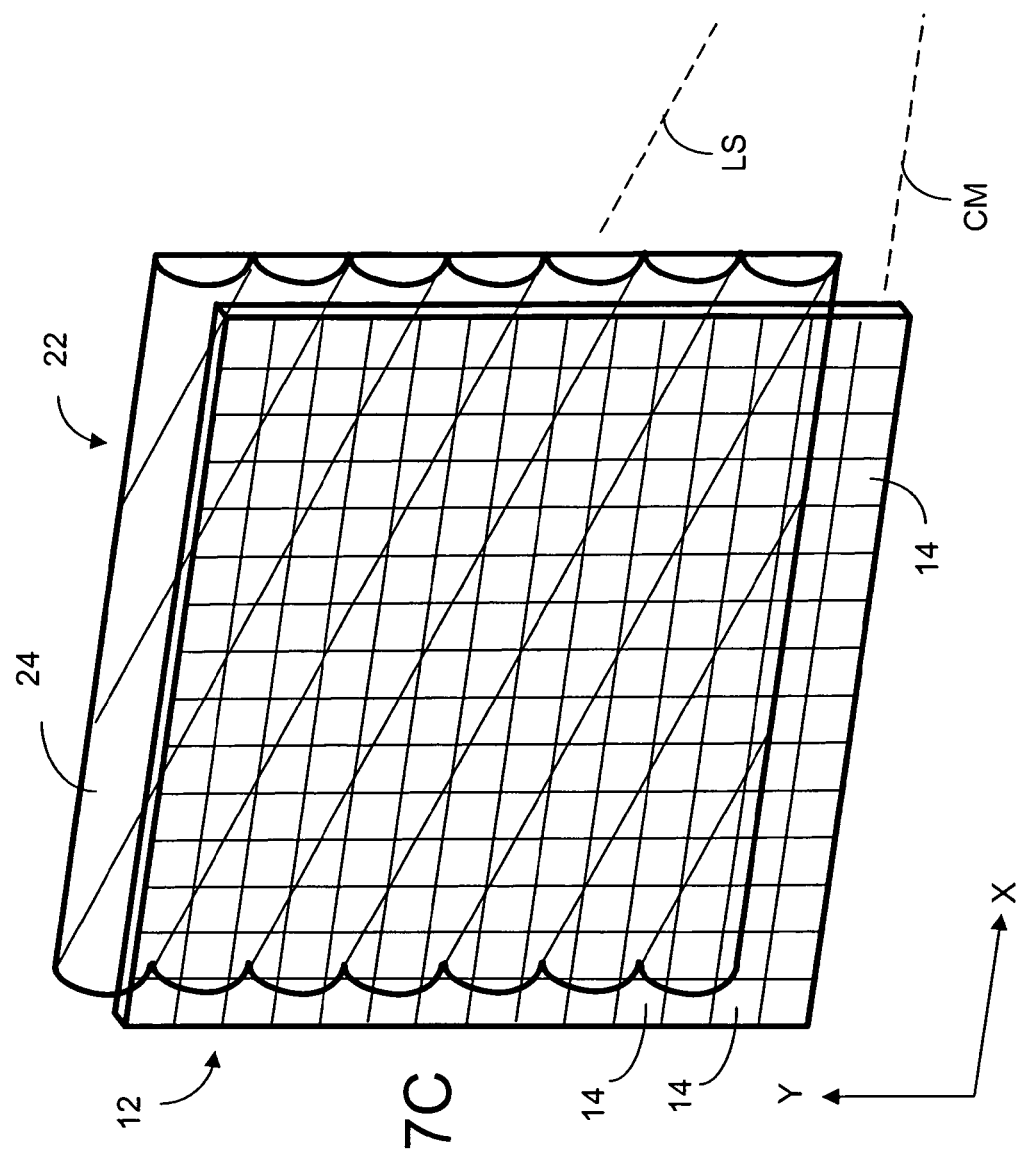

In a different embodiment, the lenticular axis LS and the column axis CM of the display panel form a 45 degree angle, as shown in FIG. 7b. As such, the 3D display system can be viewed horizontally or vertically, as shown in FIG. 7c.

In yet another embodiment, instead of using a single lenticular screen 22 as shown in FIG. 2D, two lenticular screens 22, 22' are used. As shown in FIG. 8a, the lenticular screen 22 has a lenticular axis LS and the lenticular screen 22' has a lenticular axis LS'. When the display panel is viewed in the vertical orientation, the shutter segments 32, 34 in the shutter plate 30 are substantially parallel to the lenticular axis LS. But when the display panel is viewed in the horizontal orientation, the shutter segments 32, 34 in the shutter plate 30 will be electronically rotated so that the shutter segments 32, 34 are substantially parallel to the lenticular axis LS'.

In a different embodiment, instead of using two lenticular screens 22, 22', a single screen with a two-dimensional array of spherical lenses is used. As shown in FIG. 8b, each row or each column of the spherical lenses is equivalent to a lenticule. As such, it is possible to view 3D images on a display panel oriented in the vertical direction or in the horizontal direction. For example, when a camera user takes pictures in a vertical mode or in a horizontal mode, the image is always displayed on the camera screen in an upright direction. If the camera is configured to display a 3D image on the camera screen using the 3D display panel of the present invention, it is possible to use the composite lenticular system as shown in FIG. 8a or the single screen as shown in FIG. 8b. In this situation, the shutter segments 32, 34 are also electrically rotated.

FIG. 8d illustrates an LCD or light valve shutter plate 30 having a two-dimensional array of pixels 39 for realizing the shutter segments. The pixels 39 can be programmed to form shutter segments parallel to the V axis or parallel to the H axis. As with the shutter plate 30 as shown in FIG. 8c, the width of the shutter segments can be varied and the shutter segments can be laterally shifted.

In summary, the present invention provides a 3D display system, which uses a display panel for displaying a display image, a light source for providing illumination to the display panel. A light control panel located between the light source and the display panel is used to direct light from the light source passing through the light control panel toward the display panel at least in a first direction and a different second direction. The display panel comprises a liquid crystal display panel, for example, and is arranged to display a right image and a left image alternately. In order to direct light in the first direction or the second direction, the shutter plate having a plurality of first shutter segments and a plurality of second shutter segments alternately arranged is used to control the illuminating light in synchronicity with the display of the right and left images. Each of the first shutter segments and the second shutter segments is operable in an open state to allow light to pass through and in a closed state to prevent light from passing through. As such, the first shutter segments are operated in the open state and the second shutter segments are operated in the closed state when the right-view image is displayed, and the first shutter segments are operated in the closed state and the second shutter segments are operated in the open state when the left-view image is displayed.

According to one embodiment, a lenticular screen located between the display panel and the shutter plate is used to direct the light passing through the shutter plate to the first and the second directions. The lenticular screen is positioned such that, at least in some of the lenticules, the lenticular base covers at least part of a first shutter segment and at least part of an adjacent second shutter segment. In some embodiments, the width of the shutter segments can be adjusted and/or shifted laterally.

According to one embodiment, a parallax barrier located between the display panel and the shutter plate is used to direct the light passing through the shutter plate. The parallax barrier can be made of a liquid crystal plate, for example.

The shutter plate can be an LCD plate with a one-dimensional array of narrow strips or a two-dimensional array of pixels for realizing the shutter segments. As such, the width of the shutter segments can be adjusted in relation to the lenticular pitch and the shutter segments can be laterally shifted in relation to the lenticular screen or the parallax barrier.

It should be noted that, according to various embodiments of the present invention, a parallax barrier 26 (see FIGS. 4a and 4b) can be used as a view separation panel or parallax separation sheet in lieu of a lenticular screen 22 (see FIGS. 2a and 2b). All the different adjustment schemes as illustrated in FIGS. 5a-5c are applicable to a display system that uses a parallax barrier 26 for view separation. Furthermore, if the parallax barrier is made of a light-valve material, such as a liquid-crystal display panel, for forming the opaque segments 27 and the clear segments 28 (see FIGS. 4a and 4b), it is possible to adjust the width, the pitch and location of the barrier or opaque segments according to the location of the viewer. Thus, it is possible to use a shutter plate with fixed shutter segments 32, 34 for lighting control. When both the parallax barrier and the shutter plate are made of a light valve material, such as a liquid-crystal display panel, the barrier segments and the shutter segments can be electronically rotated according to the orientation of the display panel.

In various embodiments of the present invention, the width of the lighting control segments (such as shutter segments 32, 34, half-width of the lenticules 24, parallax barrier segments 27, 28) does not need to have a fixed relationship with the size of the pixels in the display panel. In general, the width of the lighting control segments is greater than the width of pixels. Depending on the size of the display panel and the viewing distance, the ratio of width of the lighting control segments to the width of pixels can be any value ranging from 1 to 1000 or greater.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A 3D display system, comprising:
a display panel for displaying a display image, the display panel having a first side and an opposing second side;
a light source for providing illumination to the display panel through the second side; and
a light directing device comprising a light control panel located between the light source and the display panel, the light directing device configured to direct light from the light source passing through the light control panel toward the display panel at least in a first direction and a different second direction, wherein the light control panel comprises a shutter plate, the shutter plate comprising a plurality of first shutter segments and a plurality of second shutter segments alternately arranged, each of the first shutter segments and the second shutter segments is operable in an open state to allow light to pass through and in a closed state to prevent light from passing through, wherein the display panel is configured to display a left-view image and a right-view image in an alternate fashion, and wherein
the first shutter segments are operated in the open state and the second shutter segments are operated in the closed state when the right-view image is displayed, and the first shutter segments are operated in the closed state and the second shutter segments are operated in the open state when the left-view image is displayed and wherein the light directing device further comprises a lenticular screen located between the display panel and the shutter plate, the lenticular screen comprises a plurality of lenticules, each of the lenticules having a lenticule base of constant width, wherein the lenticular screen is positioned such that at least in some of the lenticules the lenticular base covers at least part of a first shutter segment and at least part of an adjacent second shutter segment, wherein the first shutter segment and the adjacent second shutter segment define a shutter pitch and the lenticule base of constant width defines a lenticular pitch of the lenticular screen, wherein the shutter pitch is substantially equal to or greater than the lenticular pitch.

2. The 3D display system of claim 1, wherein the display panel comprising a liquid crystal display panel.

3. The 3D display system of claim 1, wherein light from the light source passing through the first shutter segments is directed by the lenticules toward the display panel in the first direction and light from the light source passing through the second shutter segments is directed by the lenticules toward the display panel in the second direction.

4. A 3D display system, comprising:
a display panel for displaying a display image, the display panel having a first side and an opposing second side;
a light source for providing illumination to the display panel through the second side; and
a light directing device comprising a light control panel located between the light source and the display panel, the light directing device configured to direct light from the light source passing through the light control panel toward the display panel at least in a first direction and a different second direction, wherein the light control panel comprises a shutter plate, the shutter plate comprising a plurality of first shutter segments and a plurality of second shutter segments alternately arranged, each of the first shutter segments and the second shutter segments is operable in an open state to allow light to pass through and in a closed state to prevent light from passing through, wherein the display panel is configured to display a left-view image and a right-view image in an alternate fashion, and wherein
the first shutter segments are operated in the open state and the second shutter segments are operated in the closed state when the right-view image is displayed, and
the first shutter segments are operated in the closed state and the second shutter segments are operated in the open state when the left-view image is displayed, and wherein the light directing device further comprises a parallax barrier located between the display panel and the shutter plate, the parallax barrier comprising a plurality of clear segments and a plurality of opaque segments alternately arranged, the parallax barrier is positioned such that light from the light source passing through the first shutter segments is channeled through the clear segments and then the display panel in the first direction, and light from the light source passing through the second shutter segments is channeled through the clear segments and then the display panel in the second direction.

5. The 3D display system of claim 4, wherein the parallax barrier comprises a light valve for realizing the clear segments and the opaque segments.

6. The 3D display system of claim 1, wherein the shutter plate comprises a light valve for realizing the first shutter segments and the second shutter segments.

7. The 3D display system of claim 1, wherein the shutter plate comprises a liquid crystal panel having a two-dimensional array of pixels for realizing the first shutter segments and the second shutter segments.

8. The 3D display system of claim 1, wherein the first shutter segments and the second segments are operated in the open state simultaneously for viewing of the display image.

9. The 3D display system of claim 1, wherein the shutter pitch is adjustable in relation to the lenticular pitch.

10. A digital camera, comprising:
an optical system for acquiring one or more images; and
a 3D display system according, to claim 1 for displaying said one or more images.

11. An electronic device comprising a screen for viewing, wherein the screen comprises a 3D display system according to claim 1.

12. A method for controlling viewing of an image displayed on a display panel, the display panel having a first side and an opposing second side, said method comprising:
disposing a light source spaced from the display panel for providing illumination to the display panel through the second side;
providing a light control panel between the light source and the display panel so as to direct light from the light source passing through the light control panel toward the display panel at least in a first direction and a different second direction, wherein the light control panel comprises a shutter plate, the shutter plate comprising a plurality of first shutter segments and a plurality of second shutter segments alternately arranged, each of the first shutter segments and the second shutter segments is operable in an open state to allow light to pass through and in a closed state to prevent light from passing through;
operating the first shutter segments in the open state and the second shutter segments in the closed state when a right-view image is displayed on the display panel;
operating the first shutter segments in the closed state and the second shutter segments in the open state when a left-view image is displayed on the display panel;
disposing a lenticular screen between the display panel and the shutter plate, the lenticular screen comprising a plurality of lenticules, each of the lenticules having a lenticule base of constant width, wherein the lenticular screen is positioned such that at least in some of the lenticules the lenticular base covers at least part of a first shutter segment and at least part of an adjacent second shutter segment, such that light from the light source passing through the first shutter segments is directed by the lenticules toward the display panel in the first direction and light from the light source passing through the second shutter segments is directed by the lenticules toward the display panel in the second direction, wherein the first shutter segment and the adjacent second shutter segment define a shutter pitch and the lenticule base of constant width defines a lenticular pitch of the lenticular screen, wherein the shutter pitch is substantially equal to or greater than the lenticular pitch, and wherein the display panel is arranged for a viewer to view the right-view image and the left-view image at a location relative to the first side of the display panel, said method further comprising:
adjusting the shutter pitch in relation to the lenticular pitch based on the location.

13. The 3D display system of claim 1, further comprising:
a sensing device configured to sense a distance of a viewer from the display panel; and a shutter driver configured to adjust the shutter pitch in relation to the lenticular pitch based at least partially on the distance.

* * * * *